United States Patent [19]

Cross

[11] 4,281,920

[45] Aug. 4, 1981

[54] STAPLER ARRANGEMENT FOR A COPIER/FINISHER

[75] Inventor: Thomas R. Cross, Williamson, N.Y.

[73] Assignee: Xerox Corporation, Stamford, Conn.

[21] Appl. No.: 89,333

[22] Filed: Oct. 30, 1979

[51] Int. Cl.[3] .............................................. G03B 27/62

[52] U.S. Cl. ........................................ 355/75; 270/37; 270/53

[58] Field of Search ......................... 355/354, 75, 133; 270/37, 53; 271/4, 265

[56] References Cited

U.S. PATENT DOCUMENTS

| | | | |
|---|---|---|---|
| 3,446,554 | 5/1969 | Hitchcock et al. | 355/75 |
| 3,536,318 | 10/1970 | Gay et al. | 270/53 X |
| 3,709,595 | 1/1973 | Turner et al. | 355/133 X |
| 3,804,514 | 4/1974 | Jasinski | 355/75 |

FOREIGN PATENT DOCUMENTS 2032889 5/1980 United Kingdom .

*Primary Examiner*—Richard A. Wintercorn

[57] ABSTRACT

A stapler device is disclosed for a finishing station in a copying or duplicating machine which is arranged to produce automatically a predetermined number of copy sheet sets in accordance with a collated document stack. The copy sheets are compiled into individual sets and stapled in the upper left-hand corner of each set as viewed in a reading orientation. The staple has its bridge (crown) portion angularly related to the edges of a set corner, and for optimum strength for which the staple is capable, the angle is such as to be perpendicular to the diagonal of the set.

6 Claims, 15 Drawing Figures

STAPLER ARRANGEMENT FOR A COPIER/FINISHER

This invention relates to an automatic electrostatographic copying or duplicating system and particularly to an improvement in the finishing aspect of the system, that is, the adjunct of the system which binds collated sets of copies of a multidocument original.

With the advent of the high speed electrostatographic reproduction machines having precollation recirculating document handlers, there is need to permit the production of copies which are in correspondingly precollated sets, either stapled or unstapled, or in stacks. To this end, the machines should comprise modular assemblies which are individually mountable relative to a host machine, and are arranged so that the path of copy sheet movement is entirely in a straight line above the processing stations. Each of the modular assemblies are devised so that an operator has complete viewing of a production run involving finishing, and may be easily reached and manipulated for clearing jam conditions.

The general combination of an electrostatographic processor and a sheet attaching finishing station having a stitching or stapling device is not new, having been described in U.S. Pat. Nos. 3,446,554 and 3,804,514, both being assigned to the assignee of the present invention.

In the arrangement of the present invention, a recirculating document handling apparatus is applied to the platen of a commercial copying or duplicating machine and is devised so that precollated numbered document sheets are individually positioned upon the platen for exposure. After a document sheet is exposed, it is returned to the top of its stack in the apparatus until the set has been completely exposed. This cycle may be repeated any number of times by programming logic. In the alternative, the document handling may be such that each document sheet may be exposed repeatedly while on the platen and eventually collected in stacks.

Copy sheets which have been produced in accordance with document sheet exposure and have exited a fusing apparatus as the last xerographic processing station are reversed in their direction of movement along a path which generally parallels the path of movement of the sheets during processing. The reversing is accomplished by a turnaround device which is devised to permit easy jam clearance and to increase the velocity of sheet movement in its initial step to high speed finishing. Sheets are then directed to a first registration station for top edge registration and slight corrugation needed for further treatment and then to a compiler where sheets are collected into sets corresponding to a document set. A second registration occurs here just prior to the swinging action of a stapler device which is moved to a corner of the set to apply a staple at an angle to the edges of the corner. The stapled set is then ejected at high speed out of the compiler and into a catch tray for removal.

In accordance with the present invention, a stapler device is utilized in the finishing station for a copying or duplicating machine which is arranged to produce automatically a predetermined number of copy sheet sets in accordance with a collated document stack. The copy sheets are compiled into individual sets and stapled in the upper left-hand corner of each set as viewed in a reading orientation. The staple has its bridge (crown) portion angularly related to the edges of a set corner, and for optimum strength for which the staple is capable, the angle is such as to be perpendicular to the diagonal of the set. This arrangement provides the user with the most comfortable means in which to handle a stapled set of papers while at the same time increasing the longevity of the attachment of the staple and the sheets.

It is therefore the principal object of the invention to apply a staple to the corner or compiled sets of copy sheets automatically utilizing an automated copy sheet compiler for conditioning a collated set for a stapling operation.

This and other objects of the invention will become more apparent upon considering the following description which is to be read in conjunction with the accompanying drawings wherein.

Figure 1:
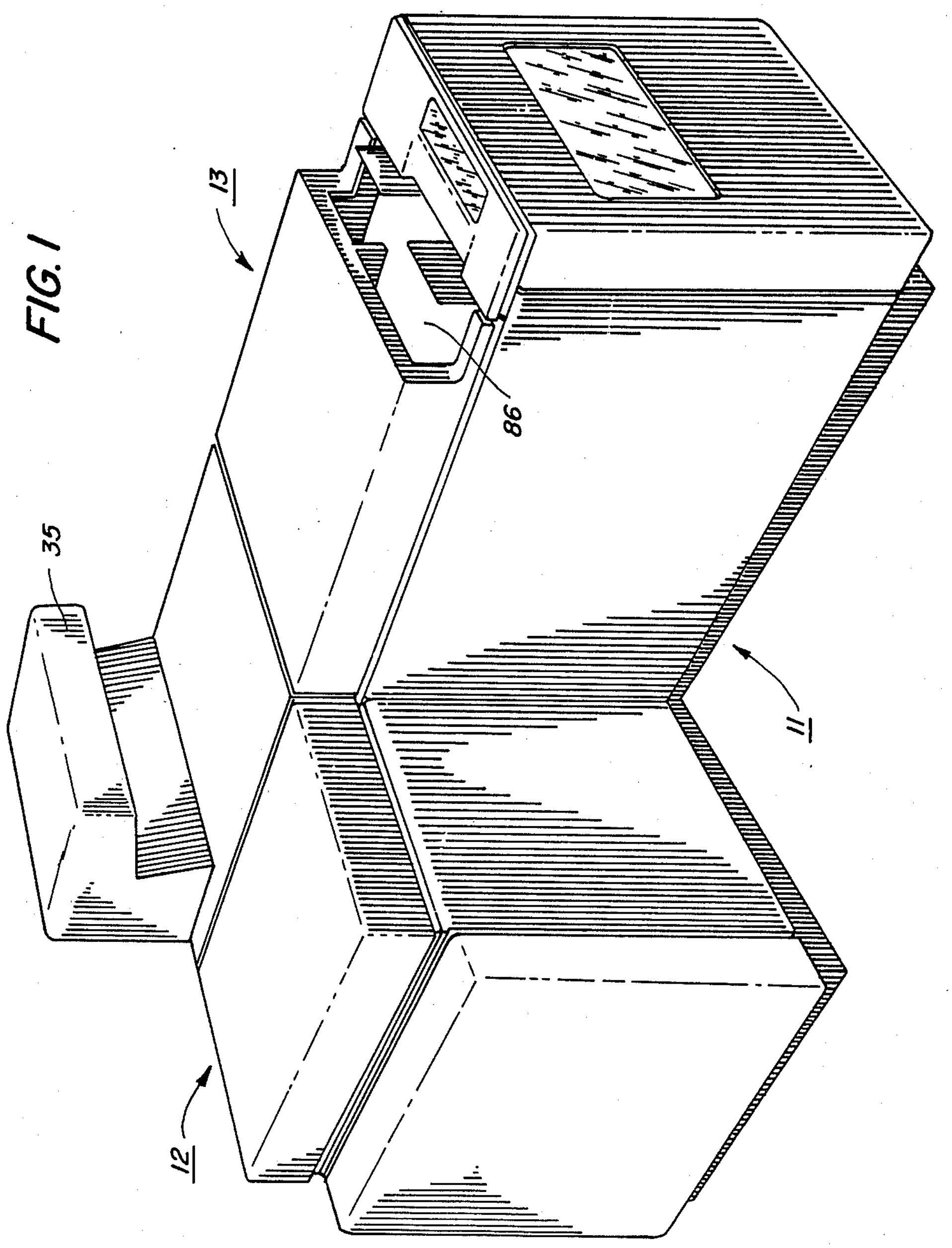
FIG. 1 is a perspective view of a production system incorporating a recirculating document handling apparatus and a finishing station according to the present invention.
Figure 2:
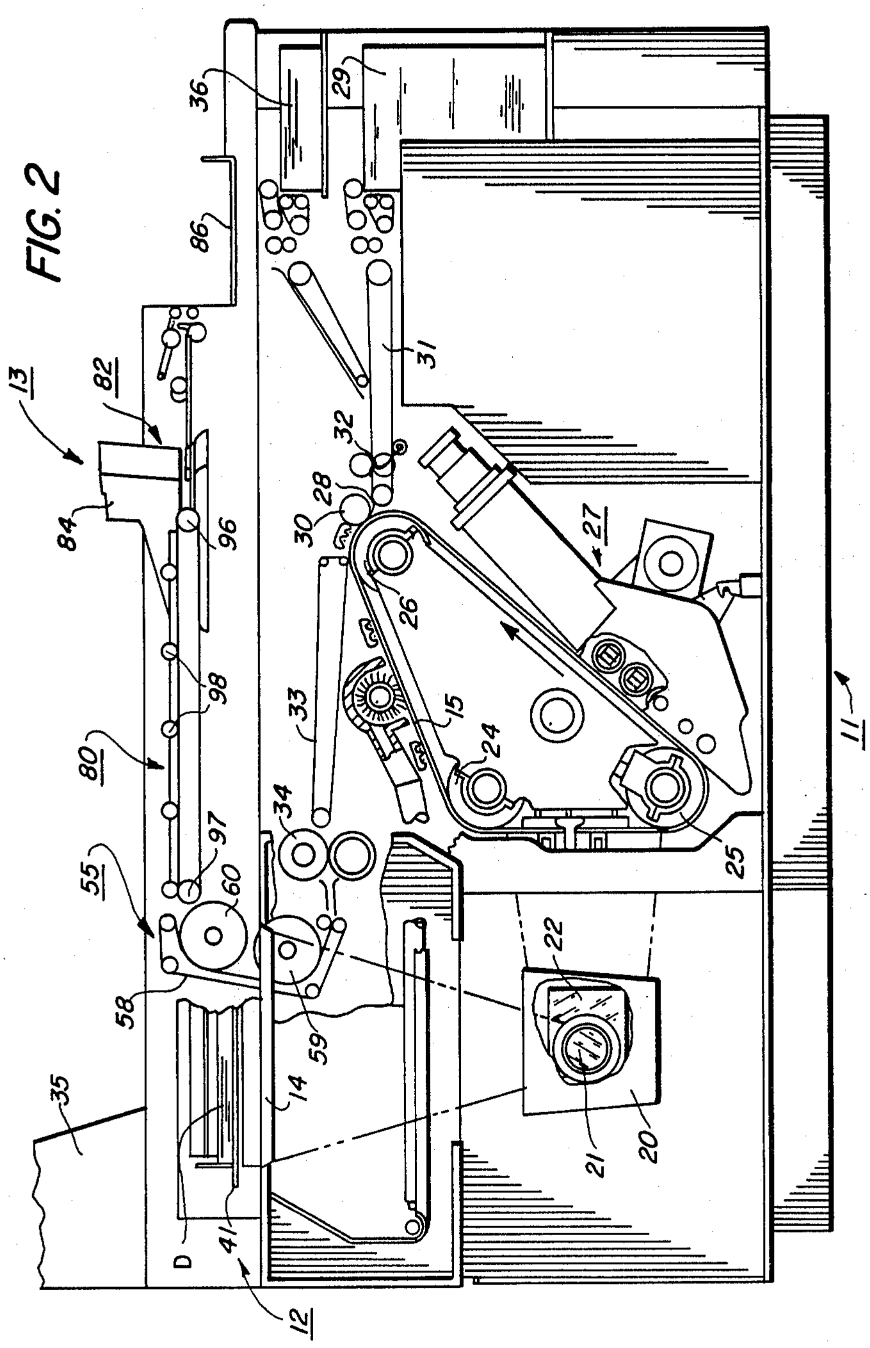
FIG. 2 is an elevational view, partly in section, of the copying system shown in FIG. 1 with the covers removed.

For a general understanding of a reproduction machine with which the present invention may be incorporated, reference is made to FIGS. 1 and 2 wherein components of a typical electrostatic printing system are illustrated. The printing system is preferably of the xerographic type as one including a xerographic processor 11, a document handling apparatus 12 and a finishing station 13. Preferably, the processor 11 is the same as the processor in the commercial embodiment of the Xerox machine model 9400 which utilizes flash, full frame exposure, for very high speed production. It will be understood that any other type of xerographic processor may be utilized.

As in all xerographic systems, a light image of an original to be reproduced is projected onto the sensitized surface of a zerographic photosensitive surface to form an electrostatic latent image thereon. Thereafter, the latent image is developed with toner material to form a xerographic powder image corresponding to the latent image on the phototsensitive surface. The powder image is then electrostatically transferred to a record material such as a sheet of paper or the like to which it may be fused by a fusing device whereby the powder image to adhere permanently to the surface of the record material.

The xerographic processor 11 is arranged as a self-contained unit having all of its processing stations located in a unitary enclosure or cabinet. The processor includes an exposure staion at which an original to be reproduced is positioned on a glass exposure platen 14 for projection onto a photosensitive surface in the form of a xerographic belt 15. The original or set of individual but document sheets are selectively transported by the document feed apparatus 12 one document sheet at a time to the platen 14 for exposure. For producing collated sets of copy sheets, the document sheets should be collated. After exposure of each document the same is returned to the top of the set until the entire set has been copied, at which time the document set handling cycle may be repeated indefinitely as described in British Pat. No. 1,492,466.

Imaging light rays from each of the documents, which is flash illuminated by suitable lamps 19, are projected by a first mirror 20 and a projection lens 21 and another mirror 22 onto the xerographic belt 15 at the focal plane for the lens 21.

THe xerographic belt 15 is mounted for movement around three parallel arranged rollers 24, 25, 26 suitably mounted in the processor 11. The belt is continuously driven by a suitable motor (not shown) and at an appropriate speed. Teh exposure of the belt to the imaging light rays from a document discharges the photoconductive layer in the area struck by light whereby there remains on the belt an electrostatic latent image corresponding to the light image projected from the document. As the belt continues its movement, the electrostatic latent image passes a developing station at which there is positioned a developer apparatus 27 for developing the electrostatic latent image.

After development, the powdered image is moved to an image transfer station 28 whereat record material or sheets of paper just previously separated from a stack of sheets 29 is applied against the surface of the belt by a transfer roller 30 to receive the developed powder image therefrom.

Each sheet is conveyed to the transfer station by a conveyor 31 which cooperates with sheet registration fingers 32 (only one shown). These fingers rotate in a counterclockwise direction, as shown in FIG. 2, and engage the leading edge of a sheet, being adapted to effect the accurate timing and positioning of a sheet relative to the movement of a developed image on the belt 15 and the other timed events in reproduction processing. Further details of the timing relationships and related structure and events are described in U.S. Pat. Nos. 3,790,270; 3,796,486; and 3,917,396, commonly assigned and which are incorporated herein by reference.

The sheet is moved in synchronism with the movement of the belt 15 during transfer of the developed image. After transfer, the sheet of paper is stripped off the belt 15 and transported by a vacuum conveyor 33 in an inverted condition to a fusing station where a fuser device 34 is positioned to receive the sheet of paper for fusing the powder thereon. After fusing, the sheet is transported to a finisher to be described hereinafter.

The system 11, 12 and 13 is under control of a programmer 35 which permits an operator various options; to turn the entire system ON or OFF; to program the reproduction system for a desired number of reproductions to be made of each original document sheet or set; to select whether simplex or duplex copies are to be made; to select a desired output arrangement; to select one of a plurality of paper trays; to condition the machine for the type of document, that is, whether one sided or two sided, to select a copy size reduction mode, and other desirable functions.

Further details of the processing devices and stations in the printer system are not necessary to understand the principles of the present invention. However, a detailed description of these processing stations and components along with the other structures of the machine printer are disclosed in U.S. Pat. No. 4,054,380 which is commonly assigned with the present invention and which is incorporated by reference herein.

Details of a suitable document handling device are illustrated and described in U.S. patent application Ser. No. 81,596, filed Oct. 30, 1979 commonly assigned, and further details thereof for the present invention is not necessary except to the extent of some of its operations. The document apparatus 40 is of the recirculating type and includes a document tray 41 adapted for supporting a stack of documents D face up. A vacuum belt, corrugating feeder mechanism 42 is located below the document tray for separating and corrugating the bottom document in the stack and forwarding the document to a take-away roll pair 43. An air knife 44 is adapted to separate each document from the stack during actuation of the belt feeder mechanism. The document is then directed by a document guide 45 to feed roll pair 46 and under a platen belt 47 onto the platen 14 for the reproduction machine for exposure thereof. After exposure the document is fed off the platen by the belt 47 into a curved guide plate and between feed roll pairs 49 and 50 and back to the doucment stack by means of a feed roll pair 51.

The document handling apparatus 40 is also provided with a sheet separator finger 53 to separate the documents to be fed from those documents returned to the document apparatus. Upon removal of the last document from beneath sheet separator finger 53, the finger drops through a slot provided in the tray. Suitable sensors are provided to sense that the last document in the set has been removed from the tray, this last document being the top document in the set, and the finger is then rotated in a clockwise direction to again come to rest on the top of the documents in the stack prior to subsequent recirculation of the document set. Further details of the document apparatus with regard to a book copying feature will be described hereinafter.

In the operation of the system described in the forgoing, a set of document sheets which are to be reproduced as individual, sequence sets are placed in the tray 41 of the document handling apparatus 40 face up. Except for copying simplex to duplex in a first pass of the document sheets, the last numbered document sheet in the set is on the bottom of the stack. As each document page is bottom fed and circulated in the path comprising the roll pair 43, guides 45, roll pair 46, plates 14, roll pair 49, guide 48, roll pair 50 and roll pair 51 back to the top of the stack, a flahs, full frame exposure is made when the document sheet is on the platen and in proper registration along the registration edge 54. Controls and programming are provided to effect copy sheet feed from the sheet supply 29 or from an auxiliary/duplex tray 36 if in the simplex to duplex mode in timed relation of each flash exposure and initiation of document sheet circulation automatic operation of the reproduction system.

As each sheet of copy paper exits from the fuser apparatus 34 after fixing of the transferred toner image, the sheet is directed upwardly and onto a path in a direction opposite to that to the fuser apparatus thereby reinverting the copy sheet so that the image thereon is on the top surface of the sheet. This turnaround operation on the sheet is provided by a turnaround conveying apparatus 55 having upper and lower transversely extending guide plates 56 arranged to receive each sheet exiting the nip of the fuser rollers in the fuser apparatus. As the sheet moves between the guide plates, it is picked up for further conveyance by a pair of pinch rollers 56 which transports the sheet between the combination of a plurality of belts 58 and cooperating flat-rimmed wheels 59, 60 arranged in contact with the belts 58 and a wireform guide 58*a*. The belts 58 are entrained around a plurality of rollers 61, 62, 63, and 64 mounted between opposed plate members 65, 66 of the turnaround apparatus 55.

The entire apparatus 55 is arranged for pivotal movement about a horizontal axis which is transverse to the path of movement of sheets of paper therethrough. The plate members 65, 66 are held in spaced, fixed parallel relationship relative to one another by suitable cross rods not shown and a pivot member 68 mounted on the machine frame for the reproduction system. The supporting rods 67 for the belt rollers 61, 62, 63 and 64 also have their ends mounted in the plate members 65, 66 for spacing and supporting the members.

Figure 4:
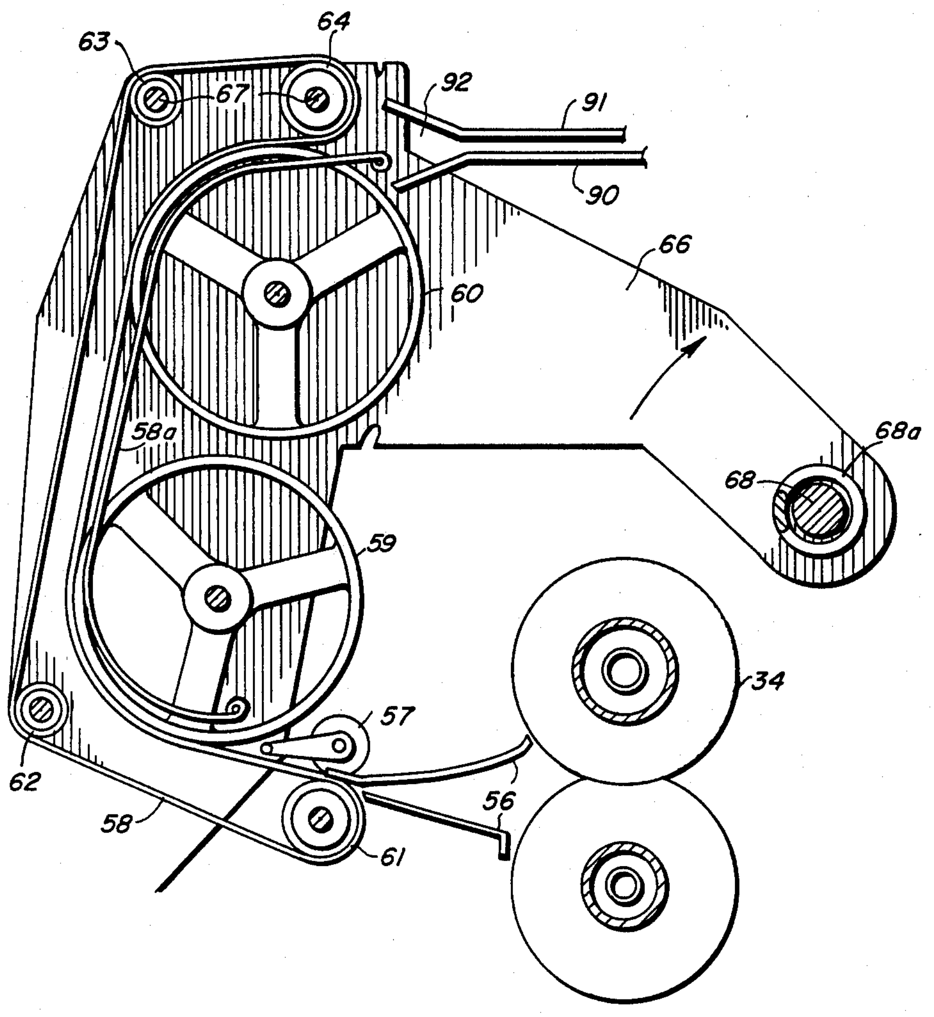
FIG. 4 is an elevational view of a turn-around assembly.
Figure 5:
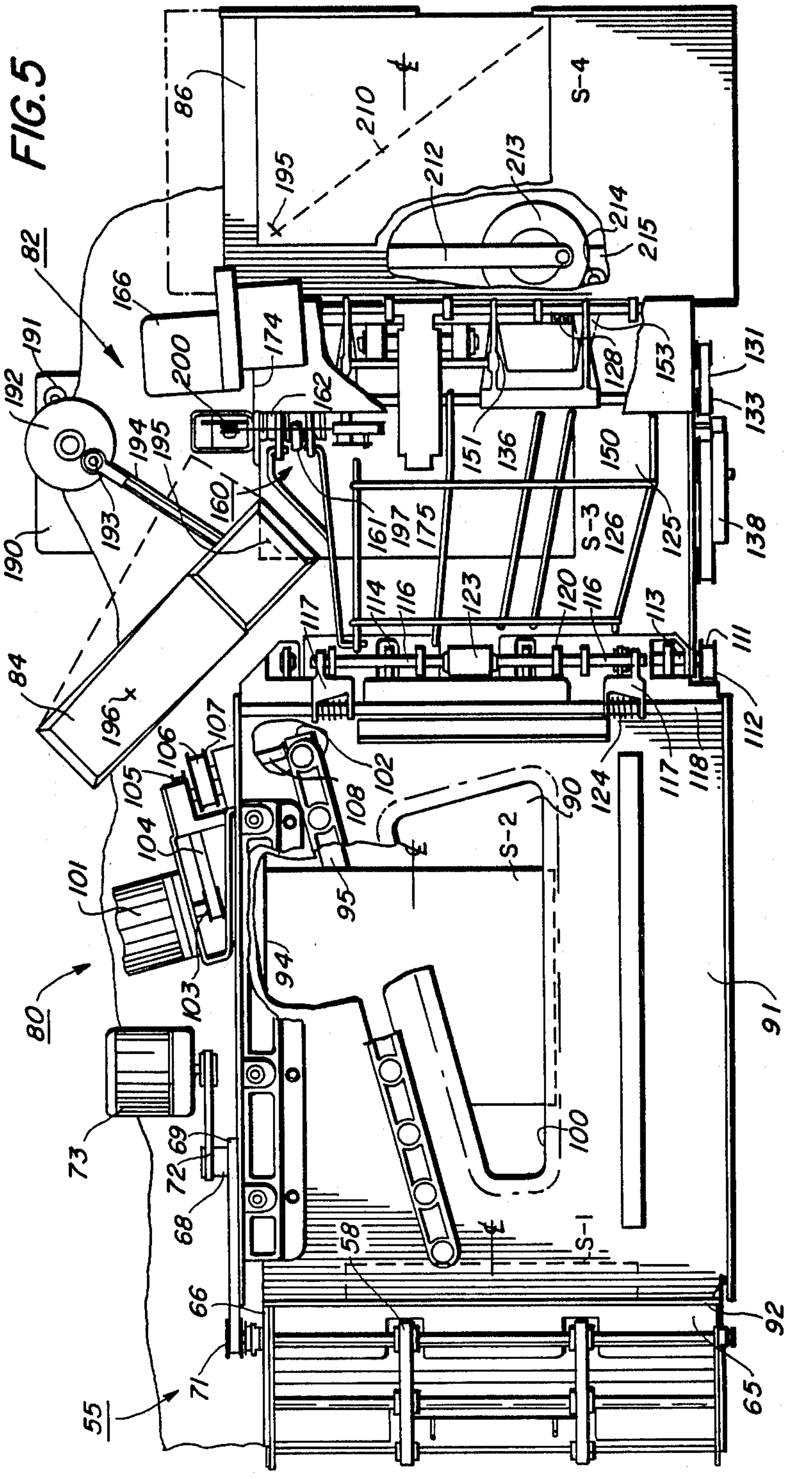
FIG. 5 is a plan view, partly in section, of the system of FIG. 2.
Figure 6:
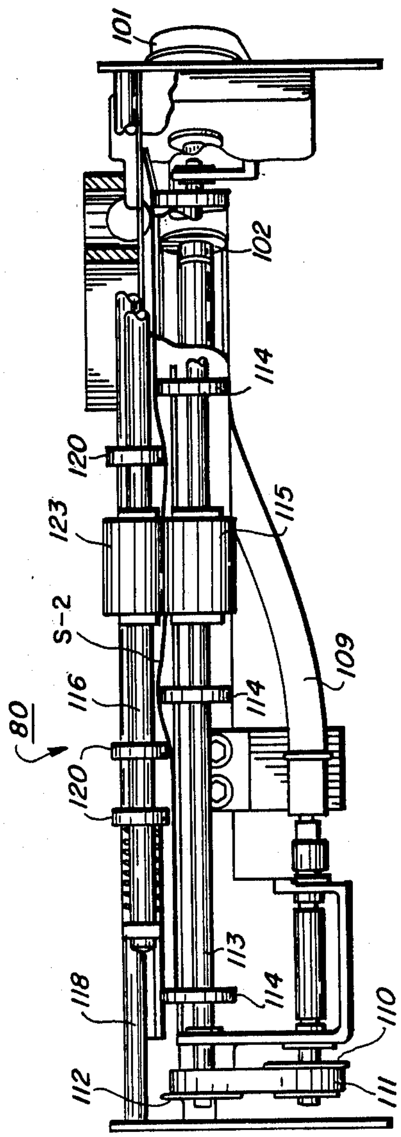
FIG. 6 is a partial elevational view of the registration transport assembly as viewed along the finisher paper path.

The pivot member 68 supports the apparatus 55 for pivotal movement in a clockwise direction as viewed in FIG. 4, to permit access to the fuser apparatus 34 and to removal of jammed sheets in the surrounding space, if this is necessary. The member 68 is provided with a spring counterbalance mechanism 68*a* which will hold the assembly 55 at any position to which it is rotated manually. As shown in FIG. 5, the member 68 also supports a drive pulley 69 on one end thereof being connected by a timing belt 70 to driven roller 71 in frictional driving contact with the belt roller 64. A suitable timing belt 72 connected to a drive motor 73 is operatively connected to the drive pulley 69 for imparting conveying movement to the belts 57.

It is to be appreciated that the sheet conveying devices comprising the belts 58 and the wheels 59, 60 are such as to minimize the extent of curvature through which a sheet must traverse in traveling through a path having opposite directions of movement. The radii of the wheels 59, 60 are relatively large and they are positioned at the extreme corners of turns so as to minimize the amount of continuous turning of a sheet at any one portion of travel and thereby prevent even slight bending thereof. Sheets leaving a fusing apparatus are still experiencing a high temperature condition and are vulnerable to conditions which produce bending due to their plastic behavior. The arrangement of the conveying devices in the assembly 55 is such as to eliminate bending stresses or cause severe sheet deformation that would otherwise accompany a sheet in being subjected to movement in reversed directions.

Each sheet of paper exiting the fuser apparatus 34 is turned around by the apparatus 55 for arranging each sheet with the image side facing upwardly during simplex copying or the second image side during duplex copying. A sheet exits the apparatus between the belts 58 and the topmost roller 60 and is conveyed thereby into a transport assembly 80 arranged above the post-transfer conveyor 33. The last pinch effect between the belts 58 and the roller 60 is functionally located to resist excessive skewing of sheets as they enter the assembly 80. In the assembly 80, a sheet undergoes a course registration alignment along one edge and slight corrugation shaping in order to condition the same for further treatment.

From the assembly 80, sheets are conveyed to a compiler assembly 82 where the sheets are compiled until a complete set of copies corresponding to the document set in the document handling apparatus 12 have been collected. Upon receiving the last copy sheet of a pre-programmed set and the stapling function has been programmed in the control panel 35, a control signal is generated to effect movement of a power driven stapler device 84, into position adjacent one corner of the compiled set, a stapling activation thereof, and return to the stapler device 84 to its inoperative initial position to await another control signal. After a set has been stapled, if the stapling mode has been programmed in the control console 35, the set of copy sheets are transported to a catch tray 86 to await removal therefrom by an operator, either at that time or after the tray has been allowed to collect a suitable number of sets. While the foregoing refers to a stapler device, it is to be understood that the stapler device 84 may take on the form of a stitching device as well.

The assembly 55 provides a transporting function wherein the speed of movement of a sheet may be slightly increased from the xerographic processing speed in the first step of increasing the velocity of sheet movement that is desirable in sheet finishing apparatus. As will be described hereinafter, the registration transport 80 adds still more speed to sheet movement as a second step of velocity increases and the conveying devices in the compiler 82 add the final, high speed velocity step to each sheet during the compiling of a copy set. By utilizing a plurality of steps of progressively increased velocity changes rather than a single maximum change minimizes undue stresses on a sheet of paper which may cause skewing and misalignment as the same enters a compiling station, and possibly jamming along the path to the station. Gradual, multiple-step increases in velocity provides sufficient tension for the sheet during each step to enable positive, error-free control of movement. This, in turn, enables the last velocity step to impart a relatively high speed to each sheet that would not otherwise be available in a single step operation. With this multiple-step arrangement the consequent high speed entrance into a compiler may eliminate the conventional use of a jogger at that point and a decurling device to remove sheet deformation.

As an illustration of exemplary velocity changes, a typical processing speed of $12\frac{1}{2}$ inches per second may be utilized for the processor 11. This being a usuable speed, each sheet of copy paper exits the fuser apparatus 34 at $12\frac{1}{2}$ inches per second. The motor device 72, 73 is then set to effect travel through the turnaround assembly 55 say, at 13 inches per second. The drive for the transport assembly 80 may then be arranged to propel each sheet to a velocity of 17 inches per second, and the compiler 82 to move each sheet at the final speed of 26 inches per second. These velocities have been found to be most efficient in terms of quality reproduction, maintenance, jamming and product enhancement.

As shown in FIGS. 4 and 5, the registration transport assembly 80 includes two parallel closely spaced horizontally arranged plates 90, 91 defining an entrance slot 92 for receiving each sheet of paper from the exit structure of the turnaround assembly 55. The plate 90 is formed with an upstanding edge 94 parallel to the centerline of the path of movement of a sheet but displaced therefrom to the far end of the plates 90, 91. The edge 94 serves as a registration edge for each sheet of paper being conveyed through the assembly 80. Each sheet of paper S-2 is conveyed through the assembly 80 by a transport belt 95 mounted on pulleys located below the lower plate 90 and having its upper run laying on the top of the lower plate 90. The longitudinal axis of the upper run of the belt 95 is at a slight angle relative to the path of travel of each sheet of paper. As shown in FIG. 5, this angle is similarly related to the registration edge 94.

The upper run of the belt 95 cooperates with a plurality of balls 98 rotatably mounted in fixed positions within a strip member 99 and arranged in a line parallel to the axis of the belt run. The balls 98, which may be made from any suitable material and under influence of gravity, freely engage the upper run of the belt and, since they are held against movement by the strip member 99, are rotated by frictional engagement by the belt 95. Each sheet of copy paper S-1 entering the assembly 80 is picked up by the first of the balls 98 and the adjacent portion of the belt and directed through the assembly by the conveying action of the balls and belt. Since the linear orientation of the balls and belt 95 are angularly related to the edge 94, the sheet is directed to and along the edge to be course registered thereby.

As shown in FIG. 5, a sheet S-1 entering and leaving the turnaround assembly 55 has its centerline in coincidence with the centerline of the processing stations for the xerographic processor 11. Since the processor 11 is the same for the commercial machine labelled the 9400 machine, copy sheets leaving the fuser 34 are oriented side edge to side edge, that is, the path of movement of a sheet is along the short dimension of the sheet. For example, for conventional $8\frac{1}{2}\times 11$ inch copy sheets, the direction of movement is along the width of the sheet. The long distance of a sheet which is transverse to the sheet path movement, is then the top and bottom of the image on the sheet. This arrangement provides variable sheet size capability, whether short or long sheets, or the various metric sizes presently used worldwide. Since the copy sheet is inverted in entering the fuser assembly, the top of the image is away from the viewer in viewing FIG. 2 so that when a sheet is being transported through the transport 80, it is in the correct reading position, viewable through an enlarged viewing and jam clearane opening 100 formed in the upper plate 91.

The angular orientation of the transporting devices 95 and 98 causes the top edge of each sheet to engage the edge 94, and to continue the conveyance of the sheet in a path having its centerline parallel to and offset from its former centerline. Motion is imparted to the transport belt 95 by a motor 101 mounted on the frame structure for the assembly 80 adjacent the registration edge 94. The motor is connected to a pulley 102 which drives the belt 95 by way of a pulley 103 on the motor shaft, a belt 104 to a pulley 105, another belt 106, a pulley 107 and to a shaft 108 to which the roller 102 is secured. As seen in FIG. 5, the axis of the drive shaft 108 is perpendicular to the axis of the driving upper run of the belt 95 and the motor 101 is mounted at an angle to accommodate this angular relationship.

The drive shaft 108 is also connected by way of a flexible drive cable 109 to a pulley 110 mounted for rotation below the bottom plate 90 on the side thereof opposite to that where the motor 101 is mounted. A belt 111 connects the pulley 110 to a pulley 112 secured at one end of a shaft 113 which is utilized in a sheet corrugating arrangement at the output end of the assembly 80. The shaft 113 is transverse to the path of movement of copy sheets exiting the assembly 80 and has rotation imparted thereto by the motor 101 in unison with the drive movement of the belt 95.

The shaft 113 rotatably supports a plurality of spaced discs 114 and a pinch roller 115 at approximately the midpoint thereof. Immediately above the shaft and parallel thereto is another shaft 116 supported by brackets 117 which in turn are rotatably supported on a fixed rod 118 fastened at its ends to the frame for the assembly 80. A plurality of rotatable discs 120 are spaced along the shaft 116 and have a diameter which permits their peripheries to overlap the peripheries of the lower arranged discs 114. At approximately the midpoint of the shaft 116, there is located pinch roller 123 in contact with the roller 115 to be driven thereby. Each sheet of paper S-2 transported through the assembly 80 is directed between the series of discs 114, 120 and the nip of the rollers 115, 123. Since the peripheries of the upper and lower discs overlap, each sheet is flexed accordingly, thereby corrugating the sheet slightly to add to its beam strength for further handling through the compiler 82 and during sheet collection therein. The brackets 117 have coil springs 124 associated therewith, the springs encircling adjacent portions of the shaft 116 and providing a slight downward force to the roller 123. With this arrangement, the shaft 118 may be rocked slightly from end to end to permit corrugation of each sheet by the discs 114, 120 under uniform pressure.

The registration transport 80 provides the first of the two top edge registration actions which are imposed upon copy sheets. This first registration is a course registration because of the fairly extreme shifting of sheets in the transport and is imposed along one dimension, the top of a sheet S-2 as shown in FIG. 5. The second top edge registration occurs in the compiler as will be described. Another registration, along a second dimension, the leading edge of a sheet is provided in the compiler 82 during collection of the copy sheets which make up a copied collated set. By utiziling these separate registration positions, accurate set cornering alignment is achieved without the otherwise need for a final station jogging action.

Since the action of a series of discs, 114, 120 is primarily to offset sheet corrugation, the drive action of the pinch rollers 115, 123 upon each sheet is slightly less than the transporting speed of the belt 95. To permit access to sheets in the assembly 80, which may be jammed therein, or to allow the operator to inspect or modify sheets, the upper plate 91 is made pivotal relative to its supporting structure on the machine frame. Since the assembly 80 is flat and mounted above the machine 11, 12, 13, sheet access is easily and quickly attained. The rocking and lifting capability of the shaft 116 also allows access to sheets at this end of the assembly.

Figure 7:
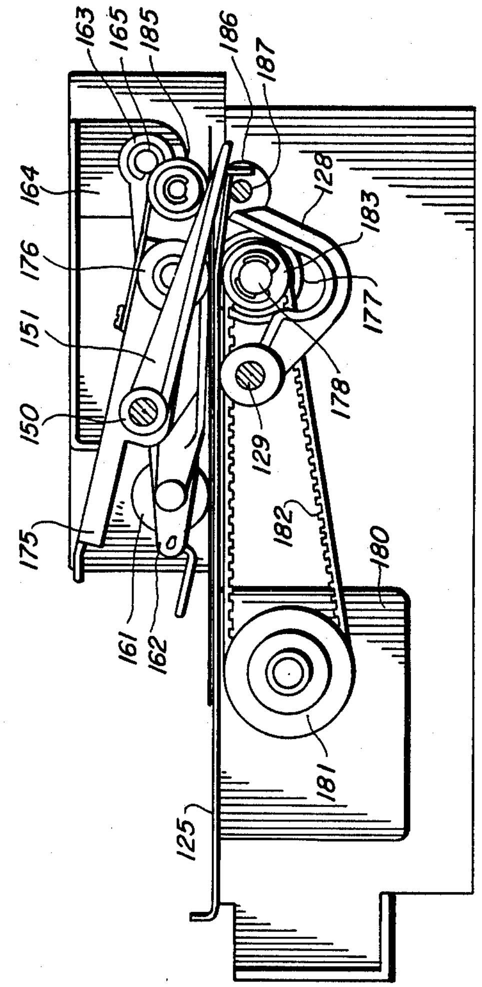
FIG. 7 is a partial cross-sectional view of a detail in the present system.
Figure 8:
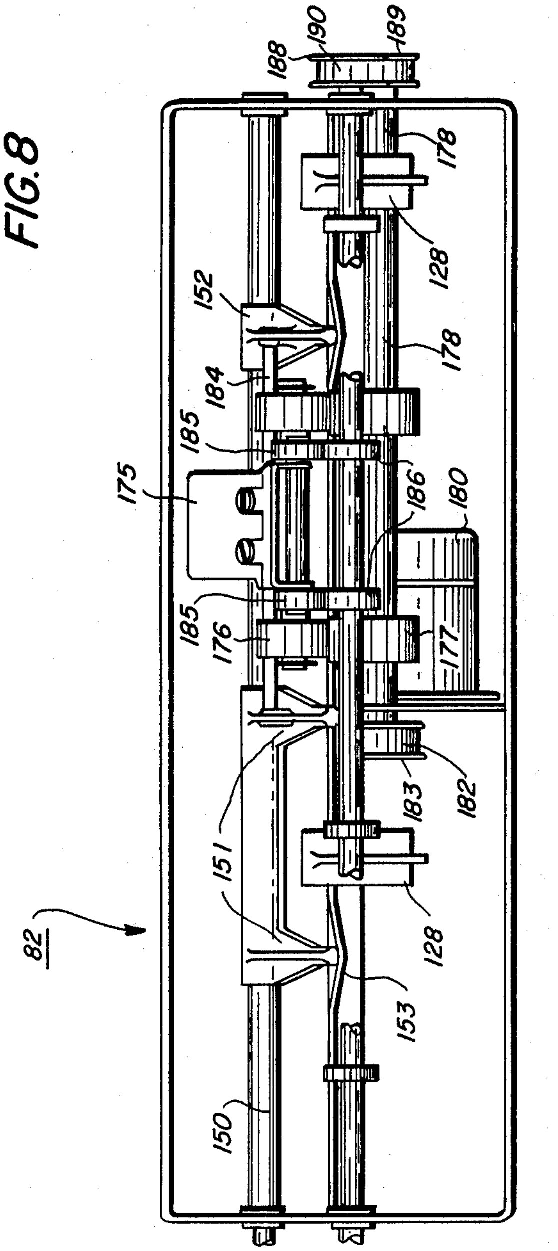
FIG. 8 is a partial elevational view of a compiler assembly as viewed along the finisher paper path.

In entering the compiler 82, each sheet is directed by the pinch rollers 115, 123 onto a horizontal plate tray 125 below a sheet holddown wire frame 126. As a set of collated copy sheets is being collected, the leading edges of the sheets stop against a pair of registration fingers or stops 128 which are in their uppermost position as shown in FIG. 8 during compilation. The registration stops 128, as shown in FIG. 7 in its lowermost position, are pivotally mounted on a shaft 129 supported at its ends on the frame for the compiler. One end of the shaft 129 has a pulley 130 fixed thereto and which coacts with a timing belt 131 also entrained around an idler pulley 132 and a drive pulley 133. The pulley 133 has a crank lever 134 secured at one end thereto, the other end of the lever rotatably supporting a cam follower 135.

Figure 9:
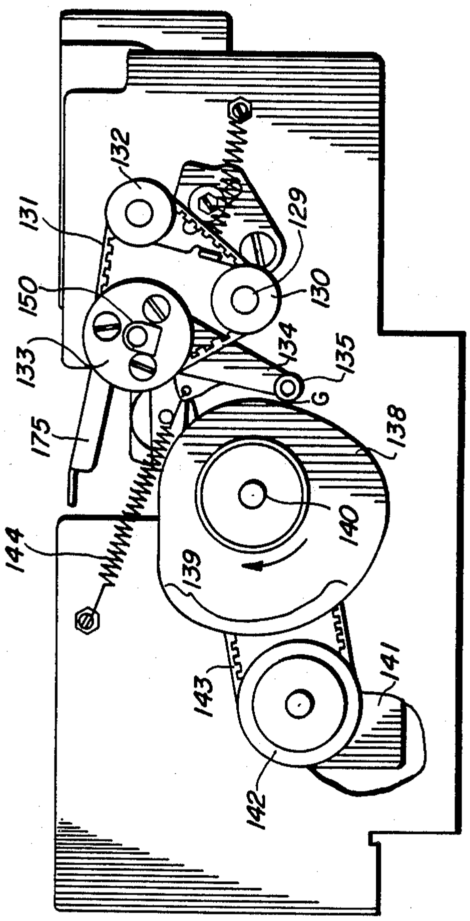
FIG. 9 is an elevational view of a drive and control mechanism utilized in the compiler of the present system.
Figure 11:
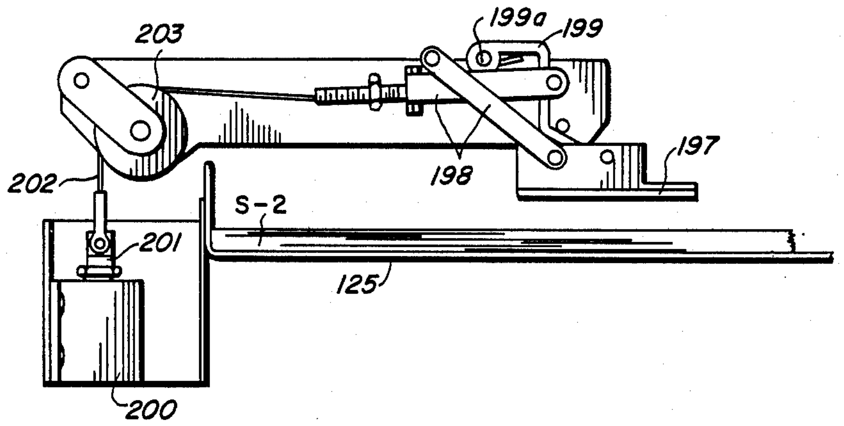
FIG. 11 is a fragmentary view of a sheet holddown device.
Figure 10:
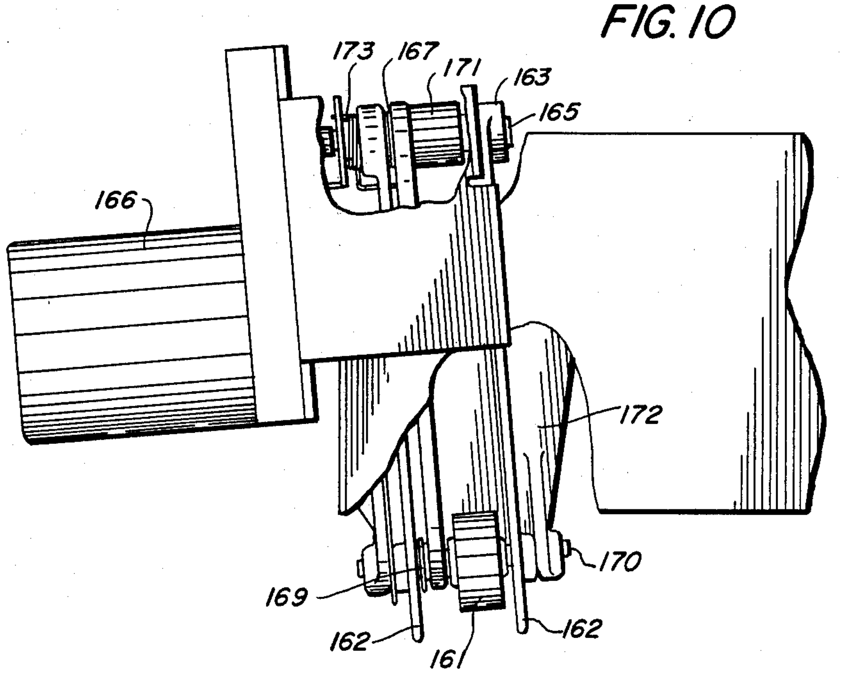
FIG. 10 is a fragmentary view of a sheet scuffer device.

As shown in FIG. 9, movement of the cam follower 135 to the right imposes a counterclockwise rotation of the crank lever 134 to effect slight rotation of the pulley 133 in the same direction. This motion of the pulley 133 causes movement of the belt 131 and rotation of the shaft 129 also in a counterclockwise rotation. This rotation produces the upper movement of the registration stops 128 through openings 136 formed in the plate 125 and into the path of movement of sheets of copy paper being conveyed into or through the compiler 82.

In order to produe this counterclockwise rotation of the crank lever 134, the compiler 82 includes an eccentric cam 138 having an enlarged cam lobe 139 secured for rotation on a fixed shaft 140. The cam 138 is rotated by an electric motor 141 by way of a pulley 142 and timing belt 143. The motor 141 is of the type which effects one-half rotation of the cam 138 for each electrical impulse or signal received by the motor. As will be described hereinafter, when the motor 141 receives a control signal, the cam 138 is rotated from the position shown in FIG. 9, wherein the registration fingers 128 are in their lowermost position, to a position 180° therefrom in order to cause the engagement of the lobe 139 of the cam against the follower 135 in order to impart counterclockwise rotation of the fingers 128. The fingers 128 will remain in the uppermost position until a complete set of copy sheets have been compiled.

When the proper number of copy sheets have been compiled as determined by programming of the number of documents in the document handler 12, the motor 141 receives another signal which rotates the cam 138 180° in order to move the cam lobe 139 from contact with the follower 135. In this event the fingers 128 are lowered back to the position shown in FIG. 9. Normally, when the stops 128 are in their lowermost position, there is a slight spacing G between the cam follower 135 and the surface of the cam 138. A suitable stop (not shown) may be used to prevent clockwise rotation of the lever 134. The spacing permits a coil spring 144 connected under tension between the lever 134 and a fixed point on the frame of the compiler to maintain a controlled spring force upon the lever in a clockwise direction when not in engagement with the cam. The purpose for this controlled force will be described below.

The pulley 133 which supports the crank lever 134 is secured to one end of a shaft 150 which is supported at its ends on the frame for the compiler 82. A pair of holddown fingers 151 rotatably supported adjacent one end of the shaft 150 and a similar single holddown finger 152 also rotatably supported adjacent its other end are arranged so that upon counterclockwise rotation of the pulley 133 for actuating the registration stops 128 in their uppermost registration position, the fingers 151 and 152 are lifted by structure to be described later from their normal lowermost point wherein they are in contact with the support plate 125. With this action when copy sheets in a set are being compiled and being registered by the registration fingers 128, the fingers 151, 152 are lifted away from the moving sheets so as not to interfere with the compilation. When a set has been completed and are to be removed from the compiler 82, the registration fingers 128 are lowered concurrently with the lowering of the holddown fingers 151, 152 as the completed set is conveyed out of the compiler. The fingers 151, 152 coact with depression sections 153 formed in the plate 125 as the copy sheet set is moved out of the compiler. The tip of the fingers 151, 152 engage the top of the set and forces portions thereof into the depressions 153 thereby effecting slight corrugation of a single sheet of paper or a completed set comprising a small number of sheets to increase its beam strength for use during continued movement of the set into the catch tray 86.

As each sheet is transported into the compiler 82, it comes under the influence of a scuffer mechanism generally indicated by the reference numeral 160. The suffer mechanism includes a scuffer wheel 161 which normally rests upon the support plate 125 to engage the topmost sheet of a set being compiled. The wheel 161 is mounted for rotation in a pair of support links 162 spaced in parallel relationship with the wheel 161 therebetween at one end thereof. The other end of the links 162 are secured to a cylindrical element 163 rotatable about a bracket 164 secured to the frame structure of the compiler. A stub shaft 165 for a motor 166 projects through the element and carries a pulley 167 for rotation therewith. The pulley 167 drives a timing belt 168 for rotating a pulley 169 secured to a shaft 170 to which the roller 161 is also secured.This arrangement permits continuous rotation of the roller 161 by the motor 166 when a sheet has been detected as approaching the compiler, but permitting lifting of the roller away from the plate 125. The pulley 167 is connected to the shaft 165 by way of a one way slip clutch 171 to allow the pulling out of a sheet of paper to the left as viewed in FIG. 5 but not to the right. The links 162 also carry a generally rectangular plate 172 which gently rests upon the topmost sheet or set when the scuffer roller 161 is also on the sheet or set. The plate 172 serves as a weight upon a set beam compiled during scuffer action by the roller 161 in order to prevent buckling or inadvertent lifting action of one or more of the sheets. The links 162 are normally held downwardly by action of a light coil spring 173 held in light tension between one of the links and a fixed portion of the frame for the compiler.

As shown in FIG. 5, axis of rotation of the roller 161, as defined by the shaft 170, is at a slight angle relative to the transverse movement of sheets of paper. This positioning of the roller provides a very slight force upon the sheet toward a registration edge 174 which is in effect an extension of the registration edge 94 in the registration transport 80. Each sheet which has been previously course registered in the registration transport 80 will be accurately registered along the edge 174 by the scuffer action of the scuffer wheel 161. The scuffer wheel 161 provides final, accurate corner registration of the sheets being compiled.

Means are provided in the compiler 82 to convey a single sheet or a collated set of copy sheets whether stapled or unstapled out of the compiler and into the catch tray 86. To this end, a set kicker mechanism is provided and comprises support member 175 secured to the drive shaft 150 to be rotated therewith at approximately the middle point thereof and betwee the arms 151 and 152. The member 175 supports a pair of spaced rollers 176 adjacent one end which cooperate with rollers 177 secured to a shaft 178 rotatably mounted on the frame for the compiler below the plate 125. The upper periphery of the rollers 177 project slightly above the top plane of the plate 125 through suitable openings therein thereby being in a position to contact the bottom sheet of a set being compiled. These rollers are intermittently driven in accordance when a signal is received by the system Controller during machine operation and are not rotating when a set is being compiled or one or more sheets are arrested in movement by the registration fingers 128. The intermittent drive may be based on copy sheet count information provided the controller by a motor 180 connected to the shaft 178 by way of a pulley 181 on the motor shaft, a timing belt 182 and a pulley 183 secured to the shaft 178.

The support member 175 has a rod member 184 secured thereto and projecting therefrom parallel to the shaft 150. This rod is secured to the fingers 151, 152 to activate the same upwardly or downwardly in accordance with the rotational movement of the member 175. This member also carries a second pair of spaced rollers 185 on its extreme outer end remote from the shaft 150. The rollers 185 are freely rotatable as are the rollers 176 and are on an axis parallel to the axis for rollers 176. Immediately below the rollers 185 are a pair of driven rollers 186 which cooperated with the rollers 185. The rollers 186 are mounted on a shaft 187 parallel with the shaft for the upper rollers and are intermittently driven along with the pair of rollers 177 by the motor 180. This drive is achieved by the shaft 187 having a driving connection to the shaft 178 by way of pulleys 188, 189 secured at the ends of the shaft respectively on a timing belt 190 connected therebetween.

In the operation of the kicker mechanism, the cam 138 is driven to a position 180° from that shown in FIG. 9, by the motor 141 in accordance with a signal from the system Controller, to effect rotation of the shafts 129 and 150 in a counterclockwise direction. This rotation of the shaft 129 positions the fingers 128 in registration position where they remain during compiling operation. The rotation of the shaft 150 rotates the member 175 counterclockwise to lift the fingers 151, 152 away from the depressions 153, and to hold the rollers 176 out of contact with the coacting rollers 177 and the copy sheets being moved therebetween. In addition, the rollers 185 are held away from contact with their cooperating rollers 186. As previously stated, the lower pairs of rollers 177, 186 are adapted to being driven in a clockwise direction as viewed in FIG. 7.

When the proper sheets have been compiled and a stapling mode has been programmed in the console 35, or if an unstapled condition has been programmed for collected sets, a control signal is derived from the system Controller (see FIG. 14) for the motor 141 to effect the simultaneous lowering of the fingers 128 and the pairs of rollers 176, 185 toward the pairs of rollers 177, 186 respectively with the collected set of copy sheets therebetween. Simultaneous with this action, the motor 180 is energized by a signal from the Controller to produce rotation of the lower rollers 177, 186 and the ejection of the set out of the compiler station and into the tray 86.

If the reproduction system has been programmed for stapling collated sets of copy sheets, after the last sheet of a set is fully registered by the transport assembly 80 and the compiler 82 and in an arrested position against the stops 128, the set is now in condition for a stapling operation. A counter in the system Controller counts when the last sheet in a set has arrived in the compiler as aforesaid. Upon this occasion, a signal is generated in the Controller for energizing a motor 190 having a pinion 191 in engagement with a gear 192 for rotating the same. The motor is such that the gear rotates for one-half revolution per energization thereof.

The gear is provided with a pivot pin 193 to which is pivotally supported a rocker arm 194 connected to the stapler apparatus 84 by a suitable ball joint pivot connection. The stapler apparatus may be any suitable type presently in commercial use which utilizes a power solenoid or cam drive, and a stapling head for separating a staple from a supply and driving the legs of the staple through a number of sheets of paper. The apparatus would also include a clinching device to bend the legs of the staple inwardly so as to fasten the sheets into a permanent set. Although not limited thereto, a preferred stapling apparatus is the "Swingline" Model 6800, manufactured by the Swingline Division of Swingline Inc. which is described in U.S. Pat. No. 3,971,969. This type of stapler has a passive clincher in the form of a fixed anvil which is moved along with its cooperating stapling head. As shown in FIG. 5, the stapling apparatus 84 is in position to apply a staple 195 into the adjacent corner of a set of copy sheets S-3 in the corner thereof that is opposite the registration corner of the set. It will be noted that the staple has been applied to the corner of the copy set at an angle relative to the edges of the corner, a further description of which will be provided hereinafter.

After a stapling operation by a signal generated in the programming system of the Controller for the reproduction system, another signal is imposed upon the motor 190 for imparting a one-half revolution of the gear 192. This action carries the pin 193 to a position 180° from that illustrated thereby carrying the rod 194 and imparting a swinging motion upon the stapler 84 about a vertical pivot 196. With the stapler device now adapted for swinging movement in the horizontal plane, the stapling head and anvil therefor is brought into position as a unit to the position of the corner of a set being stapled. This position is shown in dotted lines in FIG. 5, and is such that the sheet entering the compiler 184 from the transport 180 will not be impeded by the presence of the stapler apparatus.

Since the corner to which a staple is being applied is not the corner in which sheet registration is provided, there may be a tendency for the sheets of a set to slip during a stapling operation. To prevent slippage of sheets of paper during this stage of operation, a hold-down pad 197 is utilized to provide sufficient pressure upon the set being stapled that slippage can be minimized or eliminated altogether. The pad is adapted for vertical movement into and out of engagement with the top sheet of a set by a linkage system comprising link elements 198 and a crank element 199 which is arranged to pivot the link elements 198 in a way to force the pad downwardly when the crank is rotated about a pivot 199*a* in a counterclockwise direction.

Movement in a counterclockwise direction is attained by means of a solenoid 200 mounted on a frame of the compiler 82. The solenoid includes an armature 201 connected at its upper end to a cable 202 which in turn is connected to the upper end of the crank element 199. A pulley 203 is mounted on a suitable frame structure to convert the vertical movement of the cable 202 during actuation of the armature 201 to a horizontal direction in its attachment to crank 199. Just prior to the energization of the solenoid in the stapler apparatus 184, the solenoid 200 is energized by a signal from the Controller to pull in the armature 201 for pivoting the crank 199 in a counterclockwise direction. The force produced by the energization of the solenoid will be sufficient to provide the necessary force upon a set by the pad 197 to prevent or minimize copy sheet slippage during stapling. It is to be noted that the pad 197 and its activating linkage is such as to maintain the collected sheets S-3 against the registration edge 174 and the direction of movement of the pad will aid in maintaining registration.

After a set of copy sheets has been stapled and ejected from the compiler 82 as aforesaid, the stapled set is ejected out of the compiler into the catch tray 86. A tray S-4 is shown in the tray in the position it would occupy therein. As shown it is noted that the staple 195 is at an angle relative to the edges of the corner which make up the set. The angle of the bridge portion for the staple 195 is perpendicular to the diagonal 210 of the sheet. It has been found that a staple at this angle allows the maximum weight the top sheet is able to hold if held away from the set vertically and arranged to support the remainder of the set. For a large set, any other angle of the bridge portion of the staple may produce tearing of the top sheet along the bridge portion. This angle would vary depending upon the size of the sheets of paper. The sheets as shown, as previously stated, are in the right reading position as one views FIG. 5, and the staple has been applied at the upper left-hand corner. If larger sheets were being utilized for copy sheets, the top and bottom edges of the sheet would be longer and the diagonal 210 will assume a slightly different angle. However, with the staple 195 perpendicular thereto, the ideal staple position will still be maintained by the present arrangement of the stapler 84, the transport 80 and the compiler 82. It has been found that for standard sheets of paper, that is, $8\frac{1}{2}'' \times 11''$ size, an angle of $53\frac{1}{2}°$ from the top edge of the sheet has allowed the maximum weight to be applied to the top sheet when held vertically by the lower right corner.

After each set has been ejected into the tray 86, the tray is shifted laterally relative to the center line of the path of movement of the copy sheets by a mechanism now to be described. The lower portion of the tray is connected to a link arm 212. The link arm is pivotally connected to a rotatable gear 213 which is engageable with a pinion 214 mounted on a shaft for a motor 215 positioned below the catch tray. The motor 215 is preferably one which imparts a one-half revolution rotation of the gear 212 for each impulse thereto. Upon energization of the motor 215, by a suitable signal from the Controller, the gear rotates to a position 180° from that shown so as to move the tray from the solid line position to the dotted line position. After the ejection of the next subsequent set, the motor 215 is again energized to return the tray back to the position shown in full lines. The extent of lateral movement to either side of the center line is equal and of a suitable distance so as to insure that the corner of each set which has a staple attached thereto is not directly under the stapled corner of the next lower set thereby avoiding the increased thickness of a stack of sets being collected in the catch tray. It is to be noted that the tray occupies the same general horizontal plane as that of the compiler 82 and the registration transport assembly 80 because of the finishing function being entirely above the processor 11. With the finishing function being so located, the size of the reproduction system can be greatly reduced as will the cost of fabrication. However, this arrangement limits the number of sets which the catch tray can handle. Therefore, it is important that set separation provide the most possible number of stapled sets. The present set separation arrangement does accomplish this goal.

The Controller for the reproduction system is arranged so that after the last set in a reproduction run has been completed, as determined by the number of sets programmed and the number of document sheets counted in the document handler 12, the motor 215 receives a last control signal for effecting the movement of the catch tray 86 into its other position other than the one in which the tray was at when the last set was collected.

Figure 14:
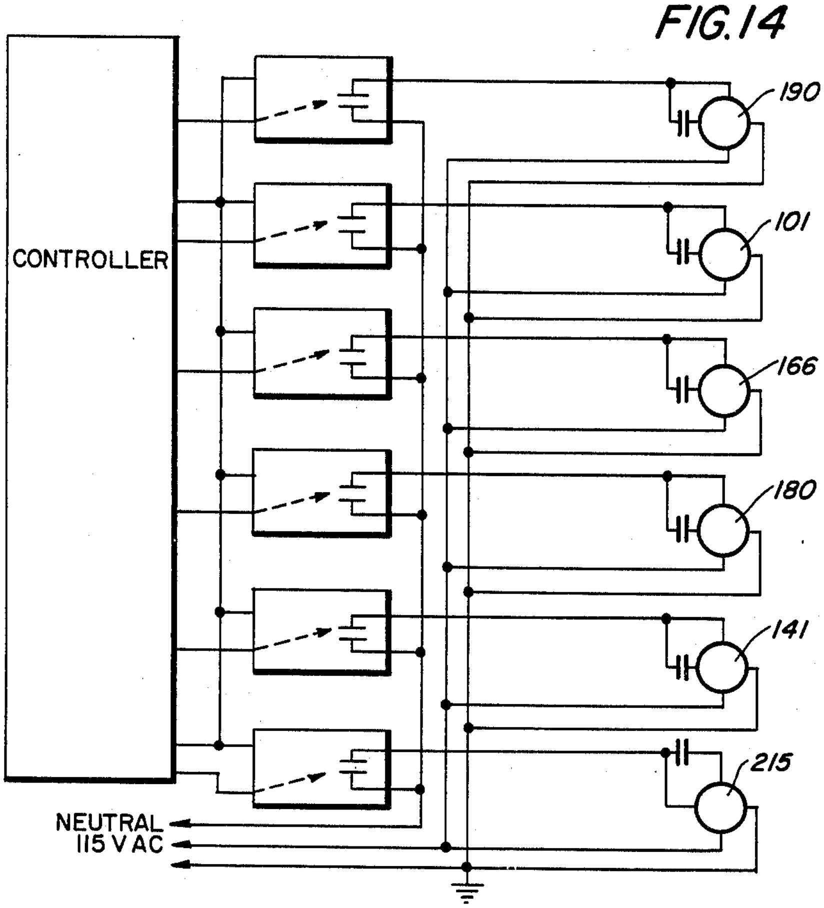
FIG. 14 is an electrical schematic of an embodiment of the circuitry for the motors utilized in the system of FIG. 2.

The Controller shown in FIG. 14 is a suitable arrangement for controlling energization of the illustrated finisher motors 101, 141, 166, 180, 190 and 215 in accordance with the foregoing. Each of the motors may be connected to the Controller by way of a suitable solid state relay as shown to effect on-off energization in accordance with logic signals generated in the Controller, either by counters, timers, interlock actions, or as a result of combined actions. Similarly, the solenoid 200 and the solenoid in the stapler device 84 may be connected to the Controller to receive control signals therefrom as discussed in the foregoing.

In the event that duplexing has been programmed in the control console 35, the stapler device 84 is disabled and sheets are conveyed through the compiler 82 with the gates 128 in their lowered position, the lateral movement of the tray 86 is also inactivated so that the single sided copy sheets collect in the tray for the initial pass of the duplex mode of operation. After the proper sheets have been so collected in the tray, as determined by suitable counters, the operator removes the collected sheets and arranges them face up in the auxiliary/duplex tray 36. From here, once the system has been restarted, the one-sided sheets are fed through the processor 11, to receive their second images in duplex fashion. The now two-sided sheets are brought through the finishing stations to be stapled, if so programmed, and deposited into the catch tray 86 with set separation. For further information regarding the control functions, reference is made to the following companion U.S. patent applications, filed on even date herewith to the common assignee: U.S. Ser. No. 89,331 entitled Simplex to Duplex Operation; U.S. Ser. No. 89,428 entitled Unlimited Catch Tray; U.S. Ser. No. 89,429 entitled Cascade Console; and U.S. Ser. No. 89,433 entitled Message Queing.

Figure 3:
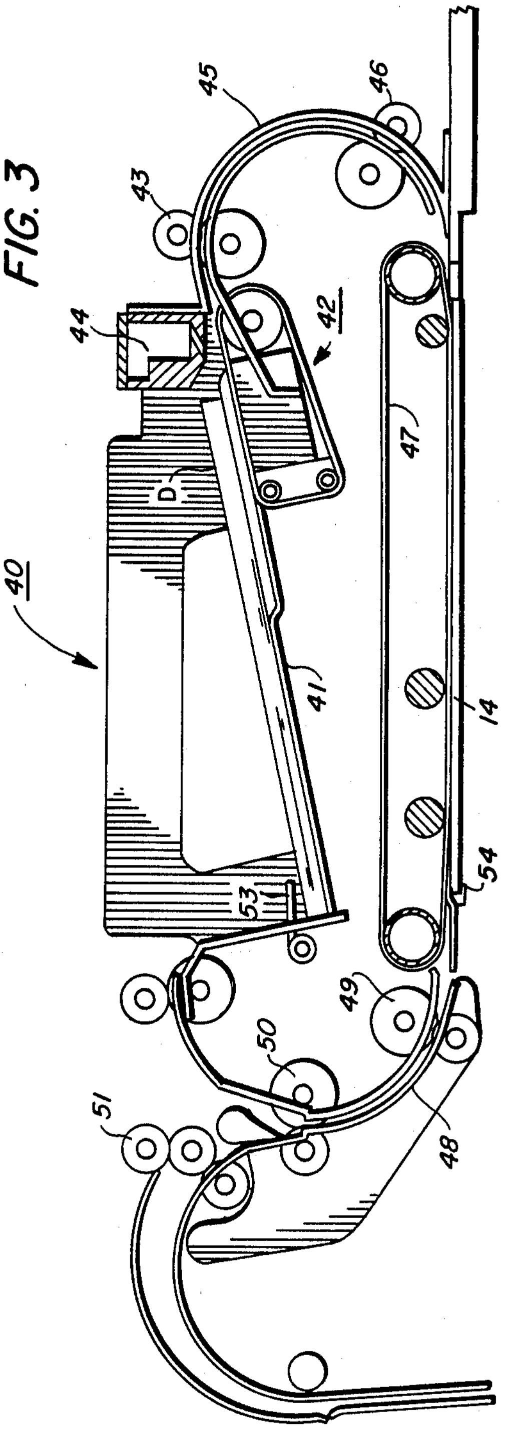
FIG. 3 is an elevational view, partly in section, of the document handling apparatus utilized in the system.
Figure 12:
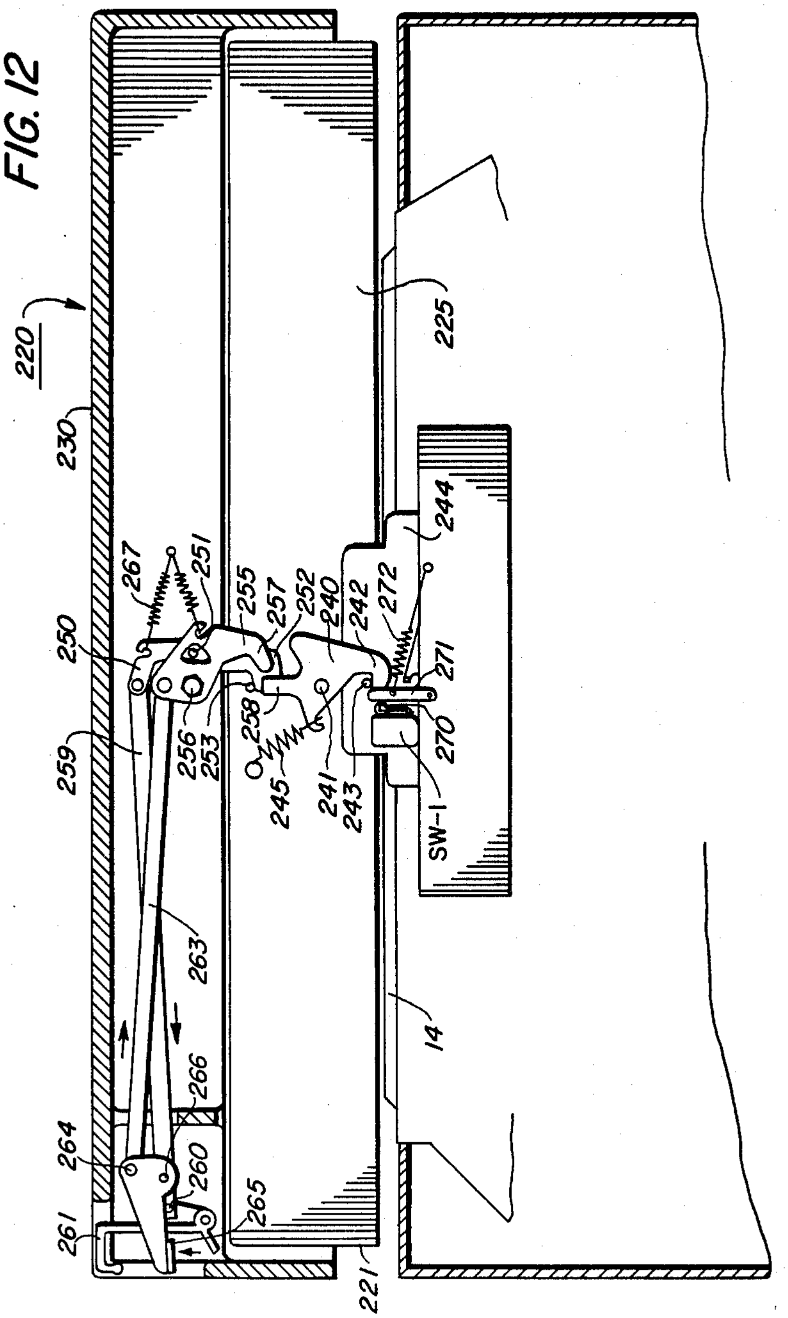
FIG. 12 is an end view, partly in section, of the double latch arrangement utilized in the illustrated document apparatus.
Figure 13:
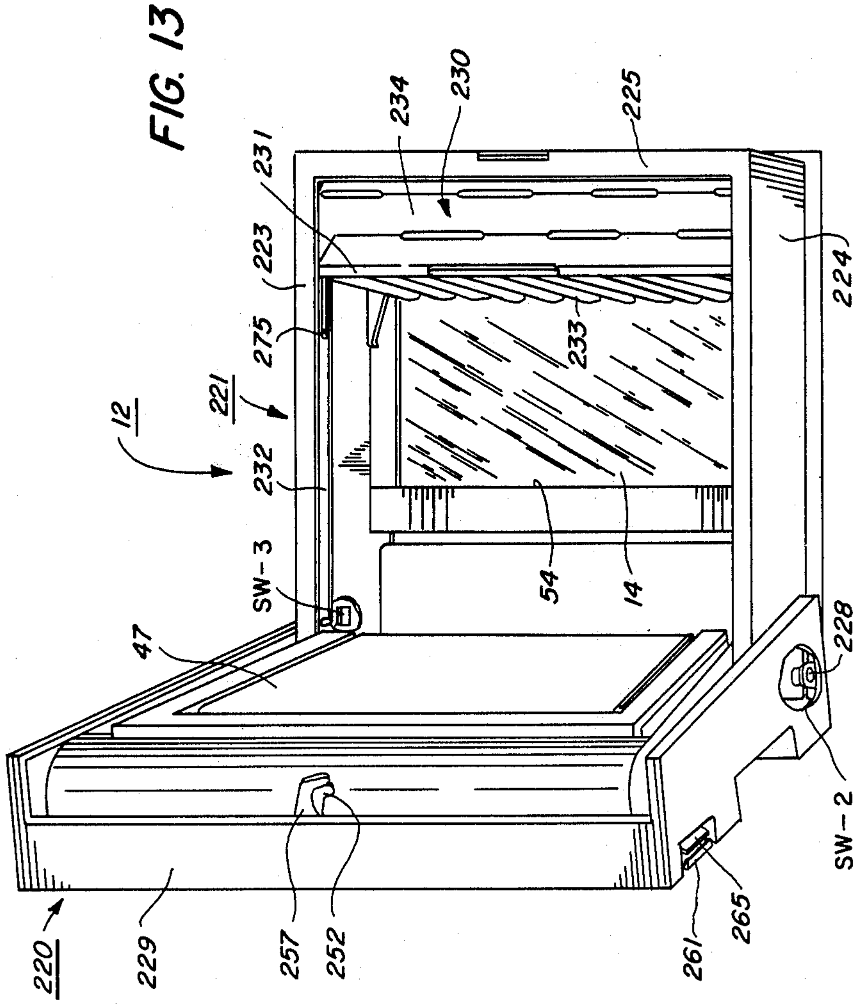
FIG. 13 is an isometric view of the document apparatus in one position of operation.

As shown in FIGS. 12 and 13, the document handler apparatus 12 comprises two pivotal sections; a recirculating document housing 220 and a bound document cover assembly 221. In FIGS. 1 and 12, the apparatus 12 is shown with the document handling device 40 contained within the section 221, both housing 220 and the assembly being applied to the platen of the reproduction system. In FIG. 13, the assembly 221 remains applied to the platen and the section 220 which supports the recirculating document handling structure 40 of FIG. 3, has been pivoted back to expose the platen 14. The bound document cover assembly 221 is devised with a large inner chamber so as to contain the entire apparatus 40 when both the housing and assembly have been applied to the platen 14.

As shown in FIG. 13, the assembly 221 is devised as a generally rectangular frame structure having side members 223, 224, a front member 225, and rear member 226. While not shown, the assembly 221 is pivoted relative to the machine frame for the platen 14 by means of a pivot rod 228 which also pivotally supports the document handling housing 220.

The document handling housing 220 has an outer covering 229 which completely surrounds the recirculating structure 40 and the frame structure of the assembly 221 when both sections are on the plate 14. Both the housing and the assembly are pivoted as a unit by virtue of the pivot rod 228, or the assembly 221 may be locked relative to the platen and only the housing 220 raised to the position shown in FIG. 13. The bound document assembly 221 includes a light-tight apparatus 230 adapted for complete containment within the confines of the end member 225. The apparatus 230 includes a frame 231 slidably mounted in rails 232 formed in the side members 223, 224 (only one shown) and extending parallel above the platen from top to bottom thereof. The frame 231 is provided with a depending curtain 233 arranged to span across the platen 14 from one extreme to the other. A suitable handle is also provided to permit an operator to slide the frame from left to right or right to left across the entire platen. Also connected to the frame 231 is a fanfold shroud 234 comprising a plurality of panels the first of which is secured to the movable frame 231. The flexible connections between the panels are light-tight, and when the curtain 233 is moved across the platen beyond the registration edge 54, the platen area is completely light-tight during illumination of a document such as a bound document or any other three-dimensional object. The height of the frame 231 and the curtain 233 may be chosen to accommodate a typical, many-paged bound document.

This arrangement permits the curtain 233 and the accordian arranged shroud 234 to be completely compressed into the fairly narrow confines of the frame element 225. In operation then, the operator need only unlatch the document housing 220 from the position shown in FIG. 1 to the position shown in FIG. 13 thereby exposing the platen 14 for the application of a bound document.

In FIG. 12, there is shown a latching mechanism which is adapted to latch both the housing 220 and the assembly 221 together upon the machine frame; to permit the vertical pivoting movement of both sections together away from the platen as a unit; or to allow the bound document cover assembly to remain on the platen and only the document handling housing moved vertically.

The double latching mechanism includes a first latching lever 240 pivotally mounted at point 241 within the front member 225 of the bound document assembly 221. The lever 240 includes a hook-shaped portion 242 which coacts with a lock pin 243 secured to a frame 244 made part of the machine structure for the reproduction system. A spring 245 normally maintains the lever in the position shown wherein the portion 242 is locked against the pin 243 thereby locking the assembly 221 relative to the platen 14 and the machine frame. The upwardly positioned document handling cover 229 includes a latching lever 250 pivotally mounted in the front wall thereof immediately above the latching lever 240. The latch element 250 is pivotally mounted at 251 and includes a hook-shaped portion 252 cooperable with a lock pin 253 secured to the front frame member 225 of the bound document assembly 221.

The housing 220 also supports a release member 255 pivotally mounted at 256 in a plane which includes the latching lever 240. The release member 255 includes a projection 257 at the lower end thereof which is adapted to contact and slightly move a tang portion 258 at the upper end of the latching lever 240 remote from the hook portion 242. The latching lever 250 is connected to one end of an elongated link 259 which has its other end pivotally connected at 260 to a manually actuable handle 261 itself pivotally supported to the outer cover member 229 at 262. The release member 255 is pivotally connected to one end of link 263, the other end of which is pivotally connected at 264 to a manually actuable handle 265 pivotally supported at 266. A spring 267 normally maintains the latching lever 250 in the position shown in FIG. 12 wherein the lever is in locking position relative to lock pin 253.

To permit the pivotal movement of the recirculating document housing 220 relative to the assembly 221 for conditioning the document apparatus 12 for bound document copying, the handle 261 is pulled outwardly in a direction indicated by the arrow for pivoting the same relative to the pivot pin 262. This motion in turn moves the link 259 in the direction indicated by the arrow to pivot the latching lever 250 in a counterclockwise direction to release the hook portion 252 from the latch pin 253. The document handling housing 220 may now be lifted upwardly to the position shown in FIG. 13. For releasing the two members 220, 221 as a unit for completely exposing the exposure platen 14, the manually actuable release handle 264 is lifted upwardly as indicated by the arrow in order to actuate the link 263 in the direction indicated by the arrow. This actuation produces clockwise rotation of the release member 255 which drives the element 257 against the tang 258 to move the same to the left. This movement unlatches the hook element 242 from the lock pin 243 and the entire structure comprising the housing 220 and the assembly 221 may be lifted by the operator as a unit away from the platen. The members 220, 221, however, remain locked together because the lever 250 remains locked relative to the pin 253.

There are three interlocked switches associated with the document handling apparatus 12 which will prevent the operation of the reproduction system in the event that the platen 14 is insufficiently covered so as to prevent inadvertent flashing of the illumination system and possibly causing under irritation of the eyes of an operator. The first switch as indicated in FIG.12 is associated with the latch element 240. The switch SW-1 has its actuating arm 270 in contact with a lever 271 which in turn is held against the hook element 242 by a spring 272. When the latching lever 240 has been actuated in a counterclockwise direction to unlock the members 220, 221, the switch which is normally closed when the members are fully latched will assume an open condition. This open condition of the switch may be connected into the illumination system to serve as an interlock relative to the processor 11 to prevent operation thereof. When the switch SW-1 is in open condition, the processor cannot be activated and flashing of a document whether in sheet form or bound volume will be inhibited. In this manner, illumination by the exposure lamps does not occur when the switch SW-1 is in open condition, indicative of the platen 14 being uncovered.

Figure 15:
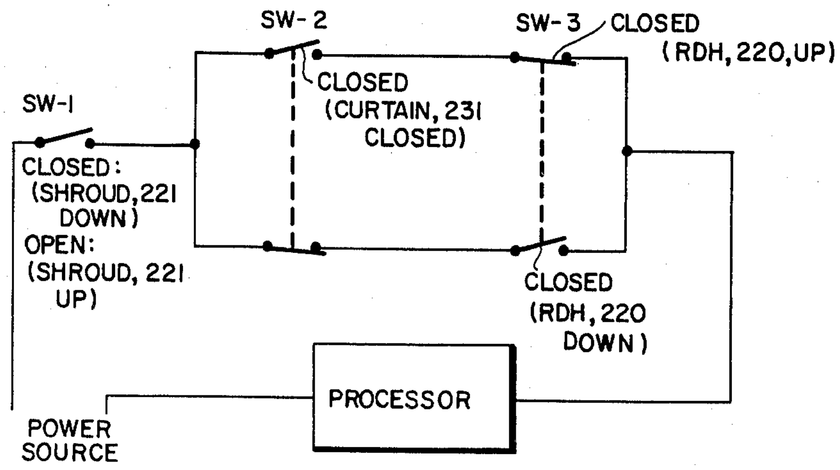
FIG. 15 is an electrical schematic of an embodiment of the circuitry for the interlock switches utilized in the document apparatus.

A second switch SW-2 is mounted adjacent the pivot rod 228 and is normally in a closed condition when the members 220, 221 are latched but arranged to be actuated to an open position when the members are pivoted a few degrees relative to their position on the platen. A third switch SW-3 located in the rail 232 for the side member 223 of the cover assembly 221 is in the normally open position but arranged to be actuated to a third position when an actuator 275 secured on the frame 230 actuates the switch to a closed condition. This closure is indicative of the complete coverage of the curtain and shroud over a bound document positioned upon the platen 14 thereby insuring a light-tight connection for proper illumination by the exposure lamps without being unpleasant to the human eye. As shown in FIG. 15, the switches SW-1, SW-2, SW-3 are arranged in electrical circuits so that the closure of any two of the switches will permit operation of illumination system for the processor 11 and complete operation of a reproduction run.

In the position shown in FIG. 13, with the bound document assembly 221 in a latched condition, the switch SW-1 is closed, the swich SW-2 is open in view of the pivotal position of the document handling housing 220, and the switch SW-3 is open since the curtain 233 and shroud 234 have not been moved to provide a light-tight condition for the platen 14. When both the members 220, 221 are completely latched as shown in FIGS. 1 and 12, the switches SW-1 and SW-2 are both closed and switch SW-3 opened, thus enabling the illumination system and operation of the processor 11.

While the invention has been described with reference to the structure disclosed, it is not confined to the details set forth, but is intended to cover such modifications or changes as may come within the scope of the following claims.

What is claimed is:

1. In an electrostatographic reproduction system having a document handling apparatus for advancing individual document sheets from a stack to an exposure station and an electrostatographic processor for processing copy sheets, the improvement comprising:
- means for compiling copy sheets into sets preparatory to attaching thereof,
- copy sheet attaching apparatus arranged to apply a fixing element to a corner of a complied set wherein said element has leg portions driven through the sheets and a bridge portion from which the legs extend,
- said applying of the fixing element to said corner being such that the bridge element is at an acute angle relative to each edge of said corner,
- said bridge element of the staple is positioned to be approximately perpendicular to the diagonal of the corners of the sheets.

2. In an electrostatographic reproduction system having a document handling apparatus for advancing individual document sheets from a stack to an exposure station and an electrostatographic processor for processing copy sheets, the improvement comprising:
- means for compiling copy sheets into sets preparatory to attaching thereof,
- copy sheet attaching apparatus arranged to apply a fixing element to a corner of a compiled set wherein said element has leg portions driven through the sheets and a bridge portion from which the legs extend,
- said applying of the fixing element to said corner being such that the bridge element is at an acute angle relative to each edge of said corner,
- said attaching apparatus is moved into position relative to said corner for applying a fixing element.

3. In an electrostatographic reproduction system having a document handling apparatus for advancing individual document sheets from a stack to an exposure station and an electrostatographic processor for processing copy sheets, the improvement comprising:
- means for compiling copy sheets into sets preparatory to attaching thereof,
- copy sheet attaching apparatus arranged to apply a fixing element to a corner of a compiled set wherein said element has leg portions driven through the sheets and a bridge portion from which the legs extend,
- said applying of the fixing element to said corner being such that the bridge element is at an acute angle relative to each edge of said corner,
- said attaching apparatus is a stapler and is movable from a position out of the path of movement of the sheets of copy paper being compiled and is moved into an active position relative to said corner for applying a staple thereto.

4. In an electrostatographic reproduction system having a document handling apparatus for advancing individual document sheets automatically from a sequenced or collated stack to an exposure station and return to the stack in repeated cycles, an electrostatographic processor for processing copy sheets, and means for compiling copy sheets into sets corresponding to the sequenced stack of document sheets preparatory to attaching thereof, the improvement comprising,
- copy sheet attaching apparatus arranged to apply a fixing element to a corner of a compiled set automatically for each repeated cycle wherein said element has leg portions driven through the sheets and a bridge portion from which the legs extend,
- said applying of the fixing element to said corner bein such that the bridge element is at an acute angle relative to each edge of said corner,
- said bridge element of the staple is positioned to be approximately perpendicular to the diagonal of the corners of the sheets.

5. In an electrostatographic reproduction system having a document handling apparatus for advancing individual document sheets automatically from a sequenced or collated stack to an exposure station and return to the stack in repeated cycles, an electrostatographic processor copy sheets, and means for compiling copy sheets into sets corresponding to the sequenced stack of document sheets preparatory to attaching thereof, the improvement comprising,
- copy sheet attaching apparatus arranged to apply a fixing element to a corner of a compiled set automtically for each repeated cycle wherein said element has leg portions driven through the sheets and a bridge portion from which the legs extend,
- said applying of the fixing element to said corner being such that the bridge element is at an acute angle relative to each edge of said corner,
- said attaching apparatus is moved into position relative to said corner for applying a fixing element.

6. In an electrostatographic reproduction system having a document handling apparatus for advancing individual document sheets automatically from a sequenced or collated stack to an exposure station and return to the stack in repeated cycles, an electrostatographic processor for processing copy sheets, and means for compiling copy sheets into sets corresponding to the sequenced stack of document sheets preparatory to attaching thereof, the improvement comprising, copy sheet attaching apparatus arranged to apply a fixing element to a corner of a compiled set automatically for each repeated cycle wherein said element has leg portions driven through the sheets and a bridge portion from which the legs extend, said applying of the fixing element to said corner such that the bridge element is at an acute angle relative to each edge of said corner, said attaching apparatus is a stapler and is movable from a position out of the path of movement of the sheets of copy paper being compiled and is moved into an active position relative to said corner for applying a staple thereto.

* * * * *

UNITED STATES PATENT AND TRADEMARK OFFICE

CERTIFICATE OF CORRECTION

PATENT NO. : 4,281,920

DATED : August 4, 1981

INVENTOR(S) : Thomas R. Cross

It is certified that error appears in the above-identified patent and that said Letters Patent are hereby corrected as shown below:

Col. 1, line 26, delete "3,446,554 and 3,804,514" and insert in place thereof --3,630,607 and 3,709,595--

Signed and Sealed this

*First* Day of *November 1983*

[SEAL]

*Attest:*

GERALD J. MOSSINGHOFF

*Attesting Officer* *Commissioner of Patents and Trademarks*